United States Patent
Bellouard et al.

(10) Patent No.: US 7,967,247 B2
(45) Date of Patent: Jun. 28, 2011

(54) METHOD AND DEVICE FOR DRIVING AN AIRCRAFT DURING THE GROUND RUN THEREOF

(75) Inventors: Rémi Bellouard, Montrabe (FR); Jean Muller, Tournefeuille (FR)

(73) Assignee: Airbus France, Toulouse (FR)

( * ) Notice: Subject to any disclaimer, the term of this patent is extended or adjusted under 35 U.S.C. 154(b) by 807 days.

(21) Appl. No.: 11/917,304

(22) PCT Filed: Jun. 12, 2006

(86) PCT No.: PCT/FR2006/001320
§ 371 (c)(1),
(2), (4) Date: Dec. 12, 2007

(87) PCT Pub. No.: WO2006/134257
PCT Pub. Date: Dec. 21, 2006

(65) Prior Publication Data
US 2008/0197239 A1    Aug. 21, 2008

(30) Foreign Application Priority Data
Jun. 15, 2005  (FR) ..................... 05 06042

(51) Int. Cl.
*B64C 25/42* (2006.01)
*G05D 1/02* (2006.01)
(52) U.S. Cl. ........................... 244/111; 701/16

(58) Field of Classification Search ............... 244/50, 244/111, 112, 87, 235, 236, 100 R, 184, 90 C; 701/3, 16
See application file for complete search history.

(56) References Cited

U.S. PATENT DOCUMENTS

| | | | |
|---|---|---|---|
| 2,355,026 | A | 8/1944 | Koppen |
| 4,008,868 | A | 2/1977 | Berg |
| 4,221,350 | A | 9/1980 | Moser |
| 4,482,961 | A * | 11/1984 | Kilner et al. ............. 701/16 |
| 7,281,684 | B2 * | 10/2007 | Steiner et al. ............ 244/111 |
| 2003/0125848 | A1 | 7/2003 | Otake |

FOREIGN PATENT DOCUMENTS

JP  62-279197  12/1987

OTHER PUBLICATIONS

International Search Report dated Nov. 7, 2006.

\* cited by examiner

*Primary Examiner* — Joshua J Michener
*Assistant Examiner* — Brian O'Hara
(74) *Attorney, Agent, or Firm* — Dickinson Wright PLLC

(57) ABSTRACT

The method of the invention includes forming a difference between left and right braking commands, by converting the difference into an additional control command for rudder and for a steerable nose gear, and applying the additional control command to the rudder and steerable nose gear according to both of the following conditions: the difference is greater than a first threshold and the combined control command transmitted to the rudder and steerable nose gear by a rudder bar is less than a second threshold.

14 Claims, 4 Drawing Sheets

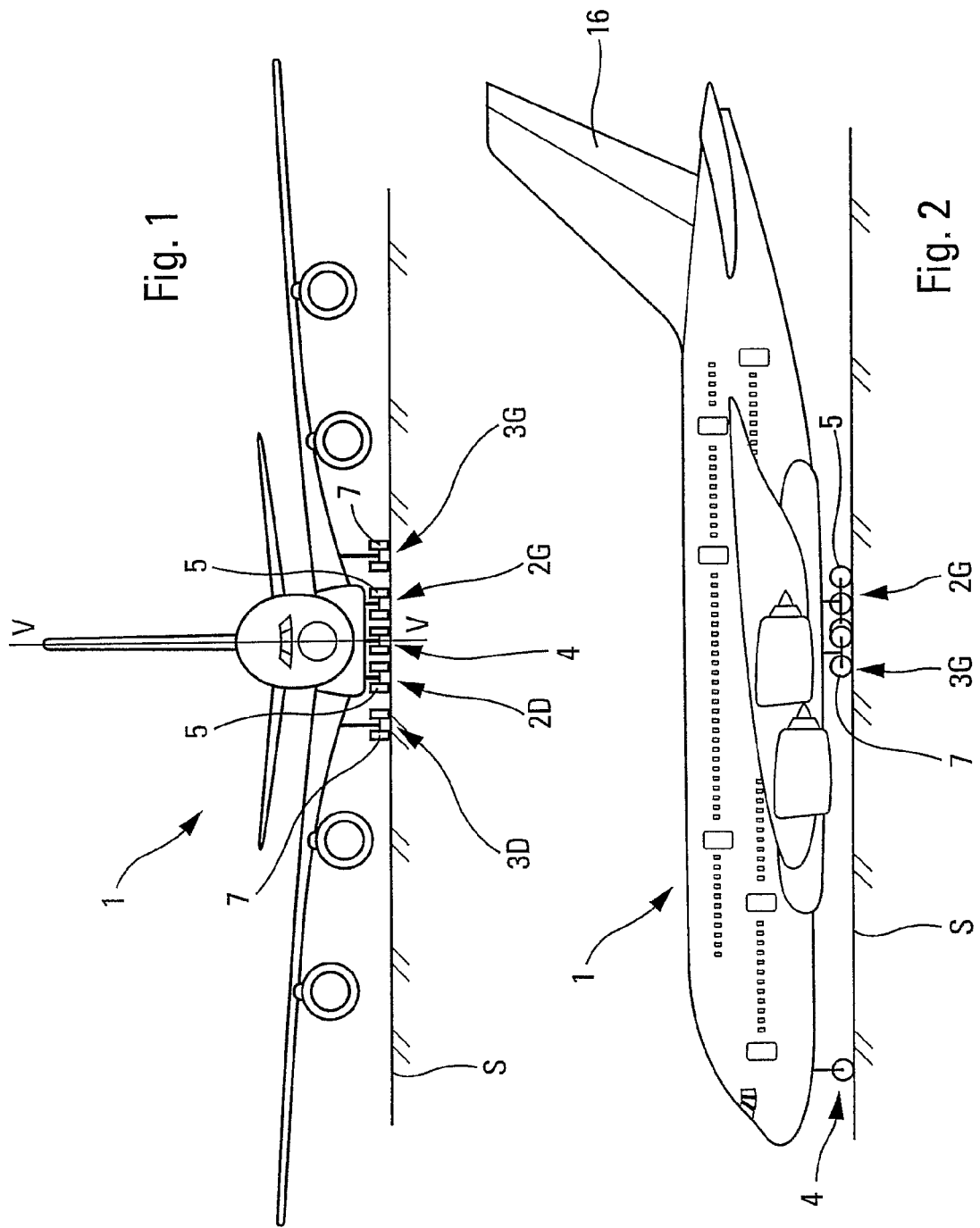

METHOD AND DEVICE FOR DRIVING AN AIRCRAFT DURING THE GROUND RUN THEREOF

TECHNICAL FIELD OF THE INVENTION

The present invention is aimed at a method and a device for driving an aircraft during its run over the ground, as well as an aircraft equipped with such a device.

BACKGROUND OF THE INVENTION

It is known that the driving of an aircraft on the ground, that is to say the yaw control of said aircraft, is chiefly effected by the rudder and the steerable nose gear, disposed near the nose of the latter (commonly called the "nosewheel"). For this purpose, the rudder and the steerable nose gear are controlled from a rudder bar, at the disposal of the pilot. A depression to the right, for example, of the rudder bar conveys the desire of the pilot to produce a yawing moment tending to move the nose of the aircraft toward the right, this yawing moment being obtained by a rightward deflection of the rudder and of the steerable nose gear.

It is known moreover that ground braking of aircraft is ensured by brakes installed on the wheels of the undercarriage legs, as well as by spoiler flaps (airbrakes) capable of increasing the drag of the aircraft and of holding it hard down on the ground so as to increase the effectiveness of the brakes of the wheels and/or by thrust reversers, the wheel brakes being controlled by a system capable of taking into account commands coming from the pilot or from an automatic device. To brake the aircraft on the ground, the pilot has two pedals mounted on the rudder bar and associated respectively with the brakes of the wheels disposed on either side of the longitudinal axis of the aircraft: thus, the right pedal can control the brakes disposed on the right of the aircraft and the left pedal can control the brakes disposed on the left. If he exerts different braking actions on the two brake pedals, the pilot produces differential braking between the wheel sets disposed on either side of the longitudinal axis of the aircraft, this differential braking producing a yawing moment for the aircraft.

The driving of an aircraft on the ground can therefore also be obtained by such differential braking. Thus, when the pilot of the aircraft wishes to correct the lateral path of the aircraft on the ground, he can act on the rudder bar, to involve the rudder and the steerable nose gear, and/or on the brake pedals, to produce differential braking.

It should however be noted that action on the brake pedals alone may, under certain conditions such as strong sidewind, engine failures, etc., be insufficient to control the lateral path of the aircraft and lead the latter to go off the taxiway.

Now, such a situation can occur in the event of failure of the rudder bar. Specifically, in this case, only the brake pedals are available for yaw control of the aircraft during its ground run.

SUMMARY OF THE INVENTION

The present invention is aimed at remedying this drawback and at making it possible to increase the yawing moment produced on the aircraft by dissymmetric action alone on the brake pedals.

To this end, according to the invention, the method for driving an aircraft during its run over the ground, said aircraft comprising:
a steerable nose gear;
a rudder, disposed at the rear of said aircraft;
a rudder bar at the disposal of the pilot of the aircraft, making it possible to address a combined control command to said steerable nose gear and to said rudder, to control said aircraft in yaw;
at least two undercarriage legs, symmetric with one another with respect to the longitudinal vertical mid-plane of the aircraft, the wheels of said undercarriage legs being equipped with brakes; and
two braking control members at the disposal of said pilot, respectively associated with said undercarriage legs and each producing a braking command to control the wheel brakes of the associated undercarriage leg,
is noteworthy in that:
the difference between said braking commands is formed;
said difference in the braking commands is transformed into an additional control command for said rudder and for said steerable nose gear; and
said additional control command is applied to said rudder and to said steerable nose gear, on the dual condition that:
said difference in the braking commands is greater than a first threshold; and
said combined control command addressed by said rudder bar to said rudder and to said steerable nose gear is less than a second threshold.

Thus, by virtue of the present invention, in the case where the rudder bar has failed with its two levers locked in the vicinity of the neutral position, a differential braking action on the part of the pilot will be able to bring about a rotation in the appropriate sense of the rudder and of the steerable nose gear, allowing the yaw control of the path of the airplane on the ground. On the other hand, if the aircraft on the ground is subjected to a strong crosswind compelling the pilot to control the path of the aircraft with the rudder bar, and possibly with a differential braking action, the latter will not be able to exert a complementary effect either on the position of the rudder, or on that of the steerable nose gear.

In a known manner, the maximum travel of each of said braking control members lies between a neutral position and a maximum braking position and, in particular, this maximum travel corresponds to a rotation of said braking control members between an angle of rotation value equal to zero (in said neutral position) and a maximum angle of rotation value (in said maximum braking position).

Advantageously, said first threshold corresponds to a fraction of said maximum travel of the braking control members lying between one third and two-thirds and, preferably, corresponds at least approximately to half of said maximum travel, that is to say said first threshold is then equal to half of said maximum angle of rotation value.

In a preferred mode of implementation of the present invention, to take into account said first threshold, prior to said transformation into an additional control command for the rudder, said difference in the braking commands is converted into a first function taking the value zero up to said first threshold and increasing, preferably linearly, onward of said first threshold, up to a maximum value attained for the maximum value (equal to the maximum angle of rotation value) of said difference in the braking commands. Said maximum value of said first function is equal to said maximum value of said difference in the braking commands.

In a manner similar to that recalled above for said braking control members, the maximum rotational travel of each of the levers of the rudder bar lies between a neutral position (corresponding to a zero angle of rotation) and a position corresponding to the maximum deflection of the rudder (corresponding to a maximum value of angle).

Preferably, the transformation of said difference in the braking commands into an additional control command for the rudder is obtained by multiplying said first function by a coefficient equal to the ratio of said maximum travel of the levers of the rudder bar to said maximum travel of said braking control members.

In order to take into account said second threshold, said additional control command thus obtained is subjected, before addition to said combined control command, to a limitation defining, with the aid of said second threshold, a domain outside which said additional control command is zero and inside which said additional control command has a limited authority on said rudder and on said steerable nose gear. The contour of said domain corresponds to a function which is zero when said combined control command is equal to said second threshold and which is equal to said second threshold when said combined control command is zero and varies linearly between these values.

Said second threshold corresponds to a fraction, for example two-thirds, of said maximum travel of the levers of the rudder bar.

As a precaution, each of said braking commands is limited before formation of their difference. Likewise, it is advantageous that the sum of said combined control command and of said limited additional control command be subjected to a limitation before application to said rudder and to said steerable nose gear.

The present invention relates moreover to a device for driving an aircraft during its run over the ground, said aircraft comprising:

a steerable nose gear;

a rudder, disposed at the rear of said aircraft;

a rudder bar at the disposal of the pilot of the aircraft, making it possible to address a combined control command to said steerable nose gear and to said rudder, to control said aircraft in yaw;

at least two undercarriage legs, symmetric with one another with respect to the longitudinal vertical mid-plane of the aircraft, the wheels of said undercarriage legs being equipped with brakes; and two braking control members at the disposal of said pilot, respectively associated with said undercarriage legs and each producing a braking command to control the wheel brakes of the associated undercarriage leg.

According to a preferred embodiment, the device of the invention is noteworthy in that it comprises:

means for forming the difference between said braking commands;

a function generator transforming said difference into a function taking the value zero up to a first threshold and increasing, onward of said first threshold, up to a maximum value attained for the maximum value of said difference in the braking commands;

means for transforming said function into an additional control command for said rudder and for said steerable nose gear;

limitation means able to limit said additional control command and defining, with the aid of a second threshold, a domain outside which said additional control command is zero and inside which the authority of said additional control command has a limited authority on said rudder and on said steerable nose gear;

means for forming the sum of said combined control command and of said additional control command limited by said second function generator; and means for applying said sum to said rudder and to said steerable nose gear.

BRIEF DESCRIPTION OF THE DRAWINGS

The figures of the appended drawing will elucidate the manner in which the invention may be carried out. In these figures, identical references designate similar elements.

FIG. 1 is an end-on view of a wide-bodied civil airplane to which the present invention can apply.

FIG. 2 is a lateral view of the airplane of FIG. 1.

DETAILED DESCRIPTION OF THE INVENTION

Figure 3:
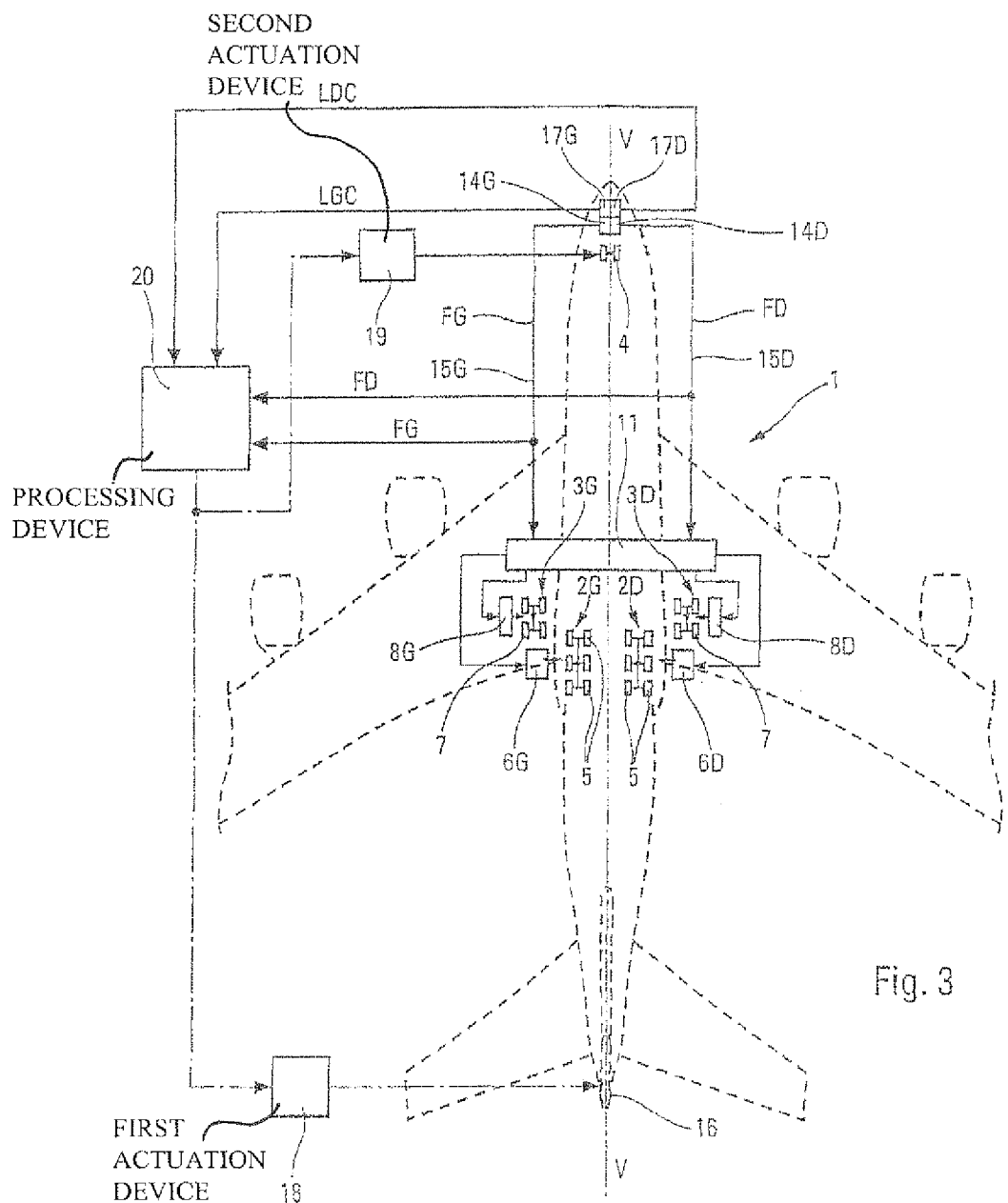
FIG. 3 is a partial view from above of the civil airplane of FIGS. 1 and 2, only the contour of said airplane being represented so as to show the location of the various wheel trains with their braking device and the ground-borne yaw control device.

The airplane 1, shown diagrammatically in FIGS. 1 and 2 and taxiing on the ground S, comprises two pairs of wheel trains 2G, 2D and 3G, 3D, respectively, as well as a steerable nose gear 4, disposed near the nose of the airplane 1 (commonly called a "nosewheel").

The two wheel trains 2G and 2D, disposed respectively on the left and on the right of the airplane 1, are symmetric with one another with respect to the longitudinal vertical mid-plane V-V of the airplane 1. Likewise, the two wheel trains 3G and 3D, also disposed respectively on the left and on the right of the airplane 1, are symmetric with one another with respect to said plane V-V. On the other hand, the two wheel trains 2G and 2D are closer to said plane V-V (and therefore to one another) than the wheel trains 3G and 3D.

Each wheel 5 of the close trains 2G and 2D is equipped with an individual brake (shown diagrammatically under the reference 9 in FIG. 4) and the individual brakes of each of the trains 2G or 2D are controlled by a control device 6G or 6D, respectively.

Likewise, each wheel 7 of the far trains 3G or 3D is equipped with an individual brake (shown diagrammatically under the reference 10 in FIG. 4) and the individual brakes of each of the trains 3G or 3D are controlled by a control device 8G or 8D, respectively.

The control devices 6G, 6D, 8G and 8D are themselves controlled by a braking distribution device 11, receiving, respectively via lines 15G and 15D, commands for left FG and right FD braking for two transducers 14G and 14D respectively associated with two members left 12G and right 12D, at the disposal of the pilot.

In a known manner, the left braking command FG is most especially used to brake the wheels 7 of the left far train 3G and can be used to brake the wheels 5 of the left close train 2G. Likewise, the right braking command FD is most especially used to brake the wheels 7 of the right far train 3D and can be used to brake the wheels 5 of the right close train 2D.

Other braking members (not represented) are preferably placed at the disposal of a copilot of the airplane 1.

Figure 4:
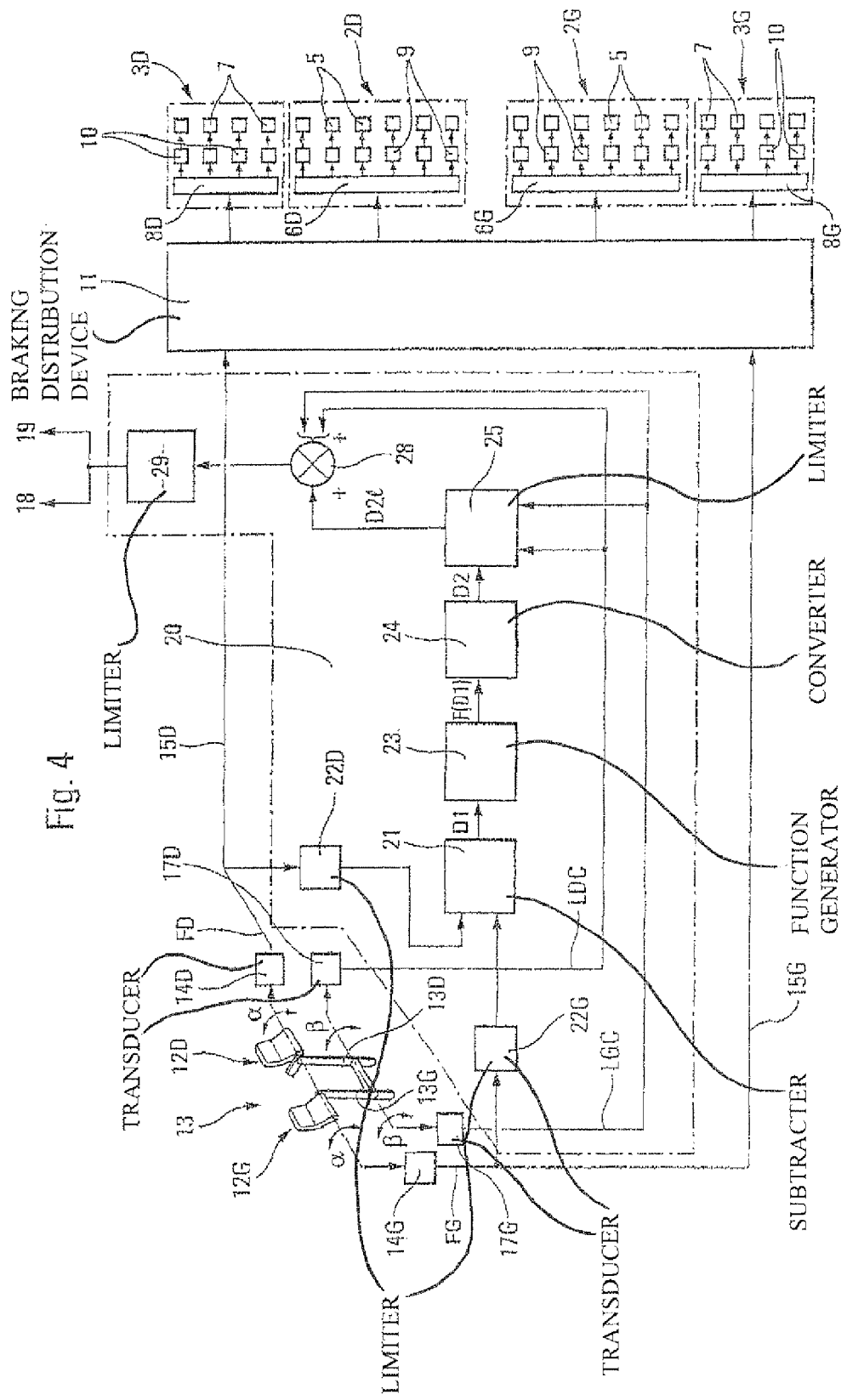
FIG. 4 gives the schematic diagram of an exemplary embodiment of the ground-borne yaw control device in accordance with the present invention.

As shown diagrammatically by FIG. 4, said braking members 12G and 12D can consist of rotary pedals, articulated respectively to the free ends of the levers 13G and 13D of the rudder bar 13 of the airplane 1.

When the pilot, with his left (or right) foot rotates the left pedal 12G (or right pedal 12D), the rotation of said pedal is detected by the left transducer 14G (or by the right transducer 14D), which produces the corresponding left braking command FG (or right braking command FD), addressed to said braking distribution device 11. The angle of rotation α of each pedal 12G or 12D lies between 0 (pedal at rest) and αmax (maximum rotation) and the corresponding braking command FG or FD is dependent on the value of said angle of rotation α.

In a known manner, the rudder bar 13 is intended, when the airplane is taxiing on the ground, to control the rudder 16 of the airplane 1 (see FIG. 2) and the orientation of the steerable nose gear 4 of the airplane 1. To this end, two transducers 17G and 17D are respectively associated with the two levers 13G and 13D of the rudder bar 13, so as to produce combined leftward LGC and rightward LDC yaw control commands, respectively. The angle of rotation β of each lever 13G or 13D of the rudder bar 13 lies between 0 (lever at rest) and βmax (maximum rotation) and the combined control commands LGC and LDC are applied to said rudder 16 and to said steerable nose gear 4 respectively by way of actuation devices 18 and 19.

In accordance with the present invention, the yaw control commands LGC and LDC, arising respectively from the transducers 17G and 17D, as well as the braking commands FG and FD, arising respectively from the transducers 14G and 14D, are transmitted to a processing device 20 able to produce an additional control command D2*l* for the rudder 16 and for the steerable nose gear 4, in the case where the differential braking is significant, while the command LGC or LDC is weak.

The processing device 20 comprises a subtracter 21 to which the braking commands FG and FD are fed, using the lines 15G and 15D, by way of respective limiters 22G and 22D intended to avoid introducing completely erroneous input data into the subtracter 21. For example, the limiters 22G and 22D require that FE and FD be limited to between 0 and αmax.

Figure 5:
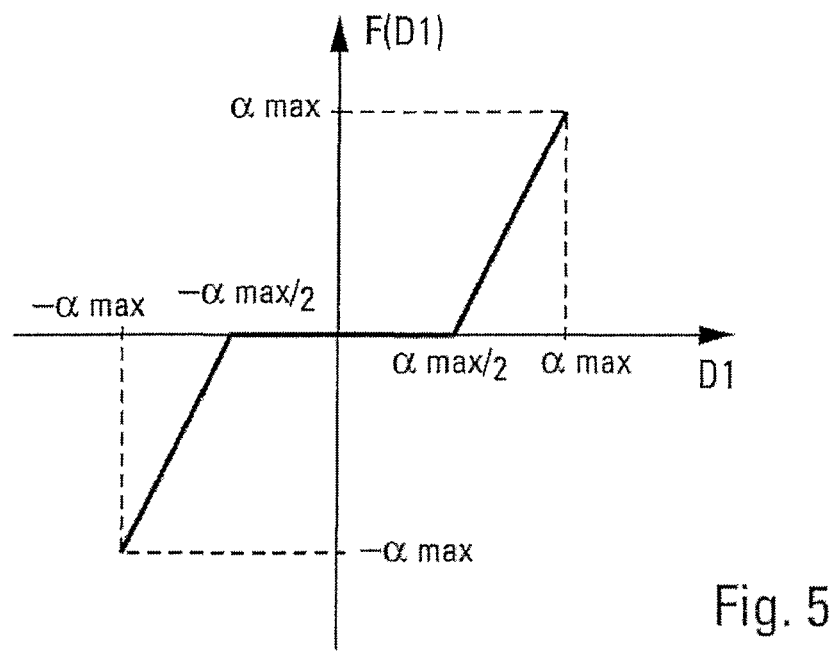
FIGS. 5 and 6 are charts illustrating diagrammatically and partially the operation of the exemplary embodiment of FIG. 4.

Thus, at its output, the subtracter 21 delivers a differential braking command D1, for example considered to be positive if FG is larger than FD and negative in the converse case. The differential braking command D1 is addressed to a function generator 23, able to transform the differential braking command D1 into a function F(D1), an example of which is shown by FIG. 5. In this example, the function F(D1) is zero below half (αmax/2) the maximum travel of the pedals 12G and 12D and is a linearly increasing function of D1 between said half maximum travel αmax/2 and the maximum travel αmax. For D1 equal to αmax, F(D1) is also at αmax.

Thus, the function F(D1) is limited at high differential braking commands above the threshold αmax/2. It is transmitted to a converter 24 able to transform it into a command for the rudder 16. For example, said converter 24 multiplies the function F(D1) by a coefficient K equal to the ratio of the maximum deflection βmax of the levers of the rudder bar 13 to the maximum rotation αmax of the brake pedals 12G and 12D.

At the output of the converter 24, an additional deflection command D2 for the rudder 16 and the steerable nose gear 4 is therefore obtained. This additional deflection command D2 is addressed to a limiter 25 which receives the control commands LGC and LDC arising from the transducers 17G and 17D tied to the rudder bar 13 and produces a function LimD2 able to limit the domain of action of the command D2 to weak rudder deflection commands 16 and to limit the authority of the brake pedals 12G and 12D on the rudder 16 and on the steerable nose gear 4.

Figure 6:
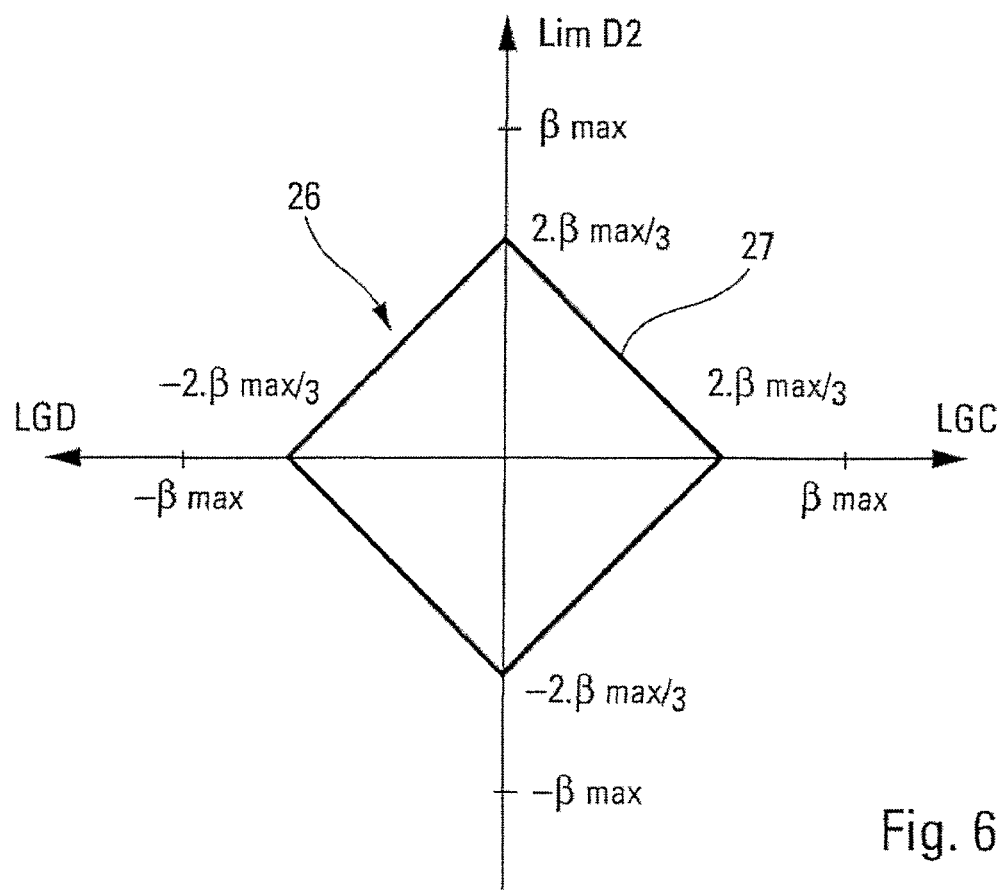

In FIG. 6 is represented an exemplary limitation domain 26 produced by the limiter 25. The domain 26 is bounded by a contour 27 satisfying a function which is zero when the combined control command LGC or LGD is equal to a threshold 2·βmax/3 equal to two-thirds of the maximum value βmax of the angle of deflection β of the levers 13G and 13D of the rudder bar 13, and which is equal to said threshold 2·βmax/3 when said combined control command is zero. Between these two points, the variation of the contour 27 can be linear.

Outside the limitation domain 26, the limiter 25 zeros the additional deflection command D2, while inside said domain the latter is compelled to vary inversely to the combined control command LGC or LGD.

Thus, at its output, the limiter 25 delivers a limited additional deflection command D2*l*, which is added to the appropriate combined control command LGC or LGD in a summator 28.

The sum thus obtained is addressed to a limiter 29, for example limiting it to the domain −βmax, +βmax, after which it is transmitted to the actuation devices 18 and 19 of the rudder 16 and of the steerable nose gear 4.

Optionally, the command D2*l* can also be addressed to aerodynamic surfaces of the airplane 1 (for example spoiler flaps, not represented) able to increase the yawing moment while moving over the ground.

Thus, in a strong crosswind, the pilot of the airplane 1 controls the path of movement of the airplane 1 with the rudder bar 13 and, if necessary, with a differential braking action on the pedals 12G, 12D. The rudder bar 13 being highly deflected, the differential braking has no complementary effect, either on the position of the rudder 16, or on the steerable nose gear 4.

Under the same conditions, if the levers 13G and 13D are locked, they are close to their neutral position, so that a differential braking action will act on the brakes and on the positions of the rudder 16 and of the steerable nose gear 4, thus allowing the path of the airplane 1 to be controlled.

It will be noted that, by virtue of the present invention, the additional command D2*l* is limited in a continuous and progressive manner as a function of the command LGC or LGD originating from the rudder bar 13, in such a manner that this additional command D2*l* actually equals zero when the command LGC or LGD reaches a certain threshold (2·βmax/3), always giving priority to the LGC or LGD command.

The invention claimed is:

1. A method for driving an aircraft during run over ground, said aircraft including a steerable nose gear and a rudder disposed at a rear of said aircraft, the method comprising:
   controlling yaw in said aircraft using a rudder bar at a disposal of a pilot of the aircraft, configured to address a combined control command to said steerable nose gear and to said rudder;
   equipping at least two undercarriage legs with brakes, the at least two undercarriage legs symmetric with one another with respect to a longitudinal vertical mid-plane of the aircraft; and
   producing a braking command to control the wheel brakes of a corresponding one of the at least two undercarriage legs using two braking control members which are at the disposal of said pilot, respectively, associated with said corresponding one of the at least two undercarriage legs,
   wherein:
   a difference between said braking commands is formed;
   said difference in the braking commands is transformed into an additional control command for said rudder and for said steerable nose gear; and
   said additional control command is applied to said rudder and to said steerable nose gear, on the dual condition that:

said difference in the braking commands is greater than a first threshold; and said combined control command addressed by said rudder bar to said rudder and to said steerable nose gear is less than a second threshold, and wherein:

a maximum travel of each of said braking members lies between a neutral position and a maximum braking position, wherein said first threshold corresponds to a fraction of said maximum travel lying between one third and two-thirds.

2. The method as claimed in claim 1, wherein said first threshold corresponds at least approximately to half of said maximum travel of said braking members.

3. The method as claimed in claim 1, wherein, prior to said transformation into an additional control command, said difference in the braking commands is converted into a first function taking a value zero up to said first threshold and increasing onward of said first threshold, up to a maximum value attained for the maximum value of said difference in the braking commands.

4. The method as claimed in claim 3, wherein said first function increases linearly between said first threshold and said maximum value of said difference in the braking commands.

5. The method as claimed in claim 3, wherein said maximum value of said function is at least approximately equal to said maximum value of said difference in the braking commands.

6. The method as claimed in claim 3, wherein the transformation of the difference in the braking commands into an additional control command for the rudder is obtained by multiplying said first function by a coefficient equal to a ratio of said maximum travel of levers of the rudder bar to said maximum travel of said braking control members.

7. The method as claimed in claim 6, wherein said additional control command is subjected, before addition to said combined control command, to a limitation defining, with aid of said second threshold, a domain outside which said additional control command is zero and inside which authority of said additional control command has a limited authority on said rudder and on said steerable nose gear.

8. The method as claimed in claim 7, wherein a contour of said domain corresponds to a function which is zero, when said combined control command is equal to said second threshold, and which is equal to said second threshold, when said combined control command is zero.

9. The method as claimed in claim 8, wherein said function varies at least approximately linearly between zero value and value equal to said second threshold.

10. The method as claimed in claim 7, wherein said second threshold corresponds to a fraction of the maximum travel of the levers of the rudder bar.

11. The method as claimed in claim 10, wherein said second threshold corresponds to two-thirds of the maximum travel of the levers of the rudder bar.

12. The method as claimed in claim 7, wherein a sum of said combined control command and of said limited additional control command is subjected to a limitation before application to said rudder and to said steerable nose gear.

13. The method as claimed in of claim 1, wherein each of said braking commands undergoes a limitation before formation of their difference.

14. A device for driving an aircraft during a run over ground, said aircraft comprising:

a steerable nose gear;

a rudder, disposed at a rear of said aircraft;

a rudder bar at a disposal of a pilot of the aircraft, configured to address a combined control command to said steerable nose gear and to said rudder, to control said aircraft in yaw;

at least two undercarriage legs, symmetric with one another with respect to the longitudinal vertical midplane of the aircraft, wheels of said undercarriage legs being equipped with brakes; and two braking control members at the disposal of said pilot, respectively associated with said undercarriage legs and each producing a braking command to control the wheel brakes of the associated undercarriage leg, wherein the device further comprises:

a subtracter forming a difference value between said braking commands;

a function generator transforming said difference value into a function taking the difference value of zero up to a first threshold and increasing, onward of said first threshold, up to a maximum value attained for the maximum value of said difference value in the braking commands;

a converter for transforming said function into an additional control command for said rudder and for said steerable nose gear;

a limiter to limit said additional control command and defining, between said first threshold and a second threshold, a domain outside which said additional control command is zero and inside which the authority of said additional control command has an authority on said rudder and on said steerable nose gear;

a summator forming the sum of said combined control command and of said additional control command limited by said limiter limitation; and first and second actuation devices applying said sum to said rudder and to said steerable nose gear, wherein a maximum travel of each of said braking members lies between a neutral position and a maximum braking position, wherein said first threshold corresponds to a fraction of said maximum travel lying between one third and two-thirds.

* * * * *